United States Patent
Han et al.

(10) Patent No.: US 12,278,362 B2
(45) Date of Patent: Apr. 15, 2025

(54) POSITIVE ELECTRODE MATERIAL, PRODUCING METHOD THEREOF, POSITIVE ELECTRODE AND LITHIUM SECONDARY BATTERY COMPRISING THE SAME

(71) Applicant: LG Chem, Ltd., Seoul (KR)

(72) Inventors: Jung Min Han, Daejeon (KR); Dong Hun Lee, Daejeon (KR); Sung Bin Park, Daejeon (KR); Hyung Man Cho, Daejeon (KR); Jin Tae Hwang, Daejeon (KR); Wang Mo Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1299 days.

(21) Appl. No.: 16/701,997

(22) Filed: Dec. 3, 2019

(65) Prior Publication Data

US 2020/0185714 A1    Jun. 11, 2020

(30) Foreign Application Priority Data

Dec. 10, 2018    (KR) .......................... 10-2018-0158016

(51) Int. Cl.
| | |
|---|---|
| *H01M 4/50* | (2010.01) |
| *H01M 4/505* | (2010.01) |
| *H01M 4/52* | (2010.01) |
| *H01M 4/525* | (2010.01) |
| *H01M 10/05* | (2010.01) |

(Continued)

(52) U.S. Cl.
CPC ........... *H01M 4/505* (2013.01); *H01M 4/525* (2013.01); *H01M 10/0525* (2013.01); *H01M 2004/028* (2013.01)

(58) Field of Classification Search
None
See application file for complete search history.

(56) References Cited

U.S. PATENT DOCUMENTS

2006/0257745 A1* 11/2006 Choi ..................... H01M 4/525
                                                            429/223
2009/0155689 A1*  6/2009 Zaghib .................. H01M 4/366
                                                            429/231.95

(Continued)

FOREIGN PATENT DOCUMENTS

| EP | 2882014 | * | 6/2015 | ............ H01M 4/525 |
| JP | 2002117832 | * | 4/2002 | ............ H01M 10/05 |

(Continued)

OTHER PUBLICATIONS

Hwang et al., Investigation of changes in the surface structure of LixNi0.8Co0.15Al0.05O2 cathode materials induced by the initial charge, Jan. 3, 2014, American Chemical Society (ACS), vol. 26, 2, pp. 1084-1092 (Year: 2014).*

*Primary Examiner* — Barbara L Gilliam
*Assistant Examiner* — Angela J Martin
(74) *Attorney, Agent, or Firm* — Lerner David LLP (57) ABSTRACT

A positive electrode material and a method of producing thereof is provided. The positive electrode material having a bimodal particle diameter distribution and including large-diameter particles and small-diameter particles, wherein the small-diameter particle is a lithium composite transition metal oxide in the form of a single particle and containing a rock salt phase formed on a surface portion thereof.

13 Claims, 5 Drawing Sheets

(51) Int. Cl.
*H01M 10/0525* (2010.01)
*H01M 4/02* (2006.01)

(56) References Cited

U.S. PATENT DOCUMENTS

| | | | | |
|---|---|---|---|---|
| 2010/0159326 A1* | 6/2010 | Sugiura | ............... | H01M 4/0471 |
| | | | | 429/223 |
| 2011/0309291 A1* | 12/2011 | Sugiura | ................ | H01M 4/505 |
| | | | | 252/182.1 |
| 2012/0070743 A1 | 3/2012 | Kwon et al. | | |
| 2017/0179483 A1 | 6/2017 | Kuriyama et al. | | |
| 2017/0309898 A1 | 10/2017 | Hong | | |
| 2018/0241036 A1 | 8/2018 | Jo et al. | | |
| 2019/0067689 A1* | 2/2019 | Hong | .................... | H01M 4/366 |
| 2019/0074513 A1* | 3/2019 | Ham | ..................... | H01M 4/505 |
| 2020/0185702 A1* | 6/2020 | Schumann | ............ | H01M 4/625 |

FOREIGN PATENT DOCUMENTS

| | | | | |
|---|---|---|---|---|
| JP | 2006228733 | * | 8/2006 | ............. H01M 4/02 |
| JP | 2016-115658 A | | 6/2016 | |
| JP | 2016115658 | * | 6/2016 | ............ H01M 4/505 |
| KR | 20070010103 | * | 1/2007 | ............ H01M 4/58 |
| KR | 20120030774 A | | 3/2012 | |
| KR | 20160075196 A | | 6/2016 | |
| KR | 20160105348 A | | 9/2016 | |
| KR | 20170023125 A | | 3/2017 | |
| KR | 2017-0063373 A | | 6/2017 | |
| KR | 20170133188 A | | 12/2017 | |

* cited by examiner

POSITIVE ELECTRODE MATERIAL, PRODUCING METHOD THEREOF, POSITIVE ELECTRODE AND LITHIUM SECONDARY BATTERY COMPRISING THE SAME

TECHNICAL FIELD

Cross-Reference to Related Application

This application claims priority to Korean Patent Application No. 10-2018-0158016, filed on Dec. 10, 2018 in the Korean Intellectual Property Office, the disclosure of which is incorporated herein in its entirety by reference.

TECHNICAL FIELD

The present invention relates to a positive electrode material and a producing method thereof, the positive electrode material having a bimodal particle size distribution and excellent in roll-pressing density, high-temperature properties, and lifespan properties.

BACKGROUND ART

As the technology development and demand for mobile devices have increased, the demand for secondary batteries as an energy source has been rapidly increased. Among such secondary batteries, lithium secondary batteries having a high energy density and voltage, a long cycle life, and a low self-discharging rate have been commercialized and widely used.

As a positive electrode active material of a lithium secondary battery, a lithium transition metal composite oxide is used. Among such lithium transition metal composite oxides, a lithium cobalt composite metal oxide such as $LiCoO_2$, which has a high functional voltage and excellent capacity properties, has been mainly used. However, $LiCoO_2$ is very poor in thermal properties due to the destabilization of a crystal structure according to de-lithium, and is expensive. Therefore, $LiCoO_2$ has a limitation in being used as a power source in a field such as an electric vehicle or the like in a large amount.

As a material to replace $LiCoO_2$, a lithium manganese composite metal oxide ($LiMnO_2$ or $LiMn_2O_4$, and the like), a lithium iron phosphate compound ($LiFePO_4$, and the like), or a lithium nickel composite metal oxide ($LiNiO_2$, and the like), and the like have been developed. Among the above materials, research and development has been actively conducted on a lithium nickel composite metal oxide which has a high reversible capacity of about 200 mAh/g, thereby easily implementing a high capacity battery. However, when compared with $LiCoO_2$, $LiNiO_2$ has a lower thermal stability, and has a problem in that when an internal short circuit occurs due to external pressure or the like in a charged state, a positive electrode active material itself is decomposed, causing the rupture and ignition of a battery. Therefore, as a method for improving the thermal stability of $LiNiO_2$, which is low, while maintaining the excellent reversible capacity thereof, a lithium-nickel-cobalt-manganese oxide in which a part of Ni is substituted with Mn and Co has been developed.

However, the lithium-nickel-cobalt-manganese oxide has a low roll-pressing density of particles, and particularly, when the content of Ni is increased to improve capacity properties, the roll-pressing density of particles becomes even lower. Therefore, when an electrode is strongly roll-pressed, there is a problem in that a current collector is broken and a positive electrode material is cracked.

In order to solve the above problem, a method has been typically proposed in which two kinds of positive electrode active materials having different average particle diameters are mixed and used such that a small-particle positive electrode active material fills in between large-particle positive electrode active materials to allow electrode coating to be performed with a relatively high roll-pressing density. By increasing the roll-pressing density through the above method, the effect of improving energy density has been obtained to some extent.

However, a lithium-nickel-cobalt-manganese oxide currently used is usually in the form of a secondary particle in which a plurality of primary particles are aggregated, and the lithium-nickel-cobalt-manganese oxide in the form of a secondary particle has a problem in that as a cycle is repeated, a gap is generated between the primary particles, thereby causing a side reaction between an electrolyte and a positive electrode active material, so that battery performance is rapidly deteriorated. Particularly, a lithium-nickel-cobalt-manganese oxide having a nickel content of 80 atm % or greater recently being developed has a lower structural stability when compared with a lithium-nickel-cobalt-manganese oxide having a nickel content of 60 atm % or less. Therefore, the above problem is more prominent.

Prior Art Document

Korean Patent Laid-open Publication No. 10-2016-0075196

DISCLOSURE OF THE INVENTION

Technical Problem

An aspect of the present invention provides a positive electrode material and a producing method thereof, the positive electrode material having a bimodal particle size distribution and excellent in roll-pressing density, high-temperature properties, and lifespan properties while containing a lithium-nickel-cobalt-manganese oxide having a nickel content of 80 atm % or greater.

Another aspect of the present invention provides a positive electrode applied with the positive electrode material, and a lithium secondary battery excellent in lifespan properties and continuous charge performance by using the positive electrode.

Technical Solution

According to an aspect of the present invention, there is provided a positive electrode material having a bimodal particle size distribution and including large-diameter particles and small-diameter particles having different average particle diameters ($D_{50}$), wherein the small-diameter particle is a lithium composite transition metal oxide having a nickel content of 80 atm % or greater in all transition metals of the lithium composite transition metal oxide, and the lithium composite transition metal oxide is a lithium composite transition metal oxide in the form of a single particle and containing rock salt phases having an average thickness of 10-30 nm on a surface portion thereof.

According to another aspect of the present invention, there is provided a method for producing a positive electrode material, the method including mixing a transition metal precursor having a nickel content of 80 atm % or greater in all transition metals of the transition metal precursor with a lithium raw material, and overfiring the mixture at a temperature of 800° C. to 850° C. to prepare a lithium composite transition metal oxide in the form of a single particle and containing rock salt phases having an average thickness of 10-30 nm formed on a surface thereof, and mixing the lithium composite transition metal oxide in the form of a single particle with large-diameter particles having a greater average particle diameter ($D_{50}$) than the lithium composite transition metal oxide in the form of a single particle.

According to yet another aspect of the present invention, there are provided a positive electrode and a lithium secondary battery including the positive electrode material of the present invention described above.

Advantageous Effects

A positive electrode material of the present invention includes large-diameter particles and small-diameter particles having different average particle diameters ($D_{50}$) so that the small-diameter particles fill in gaps between the large-diameter particles. Therefore, during electrode coating, the coating may be performed with a high roll-pressing density, so that excellent energy density may be implemented.

In addition, the positive electrode material of the present invention uses, as a small-diameter particle, a lithium composite transition metal oxide in the form of a single particle having a nickel content of 80 atm % or greater and containing rock salt phases having an average thickness of 10-30 nm on a surface portion thereof, so that high capacity properties may be implemented. In addition, particles may not be broken much during roll-pressing, a gap may not be generated between primary particles when a cycle is repeated, (hereinafter, referred to as 'cycle crack'), and a side reaction with an electrolyte may be minimized.

A positive electrode produced using the positive electrode material of the present invention described above and a secondary battery including the positive electrode use a high-nickel positive electrode material having a nickel content of 80 atm % or greater, and thus, are excellent in high-temperature storage properties, high-temperature lifespan properties, and continuous charge performance as well as in capacity properties.

MODE FOR CARRYING OUT THE INVENTION

It will be understood that words or terms used in the specification and claims of the present invention shall not be construed as being limited to having the meaning defined in commonly used dictionaries. It will be further understood that the words or terms should be interpreted as having meanings that are consistent with their meanings in the context and the technical idea of the invention, based on the principle that an inventor may properly define the meaning of the words or terms to best explain the invention.

In the present specification, an average particle diameter ($D_{50}$) may be defined as a particle diameter based on 50% of a particle diameter distribution, and may be measured by a laser diffraction method. Specifically, the average particle diameter ($D_{50}$) may be measured by dispersing target particles in a dispersion medium, and then using a commercially available laser diffraction particle size measurement device (for example, Microtrac MT 3000), irradiating an ultrasonic wave of about 28 kHz to an output of 60 W on the dispersed particles. Thereafter, the average particle diameter ($D_{50}$) may be measured based on 50% in a particle number distribution according to particle diameters in the measurement device.

In the present specification, % means wt % unless otherwise stated.

Hereinafter, the present invention will be described in more detail.

The present inventors have repeatedly conducted research on developing a positive electrode material excellent in roll-pressing density, high-temperature properties, and lifespan properties while containing a lithium-nickel-cobalt-manganese oxide having a nickel content of 80 atm % or greater, and have found that by using a positive electrode material having a bimodal particle size distribution in which a lithium composite transition metal oxide in the form of a single particle and containing a rock salt phase having a specific thickness formed on a surface portion thereof is used as a small-diameter particle, and a large-diameter particle having a greater average particle diameter than the small-diameter particle is mixed therewith, it is possible to prevent cycle crack generation and performance deterioration when exposed to a high temperature, and have completed the present invention.

<Positive Electrode Material>

Hereinafter, a positive electrode material according to the present invention will be described in more detail.

The positive electrode material of the present invention is a positive electrode material having a bimodal particle size distribution and including large-diameter particles and small-diameter particles having different average particle diameters ($D_{50}$). At this time, the small-diameter particle is a lithium composite transition metal oxide having a nickel content of 80 atm % or greater in all transition metals of the lithium composite transition metal oxide, and the lithium composite transition metal oxide is characterized in being a lithium composite transition metal oxide in the form of a single particle and containing rock salt phases having an average thickness of 10-30 nm on a surface portion thereof.

As in the present invention, when large-diameter particles and small-diameter particles having different average particle diameter ($D_{50}$) are mixed and used, gaps between the large-diameter particles are filled with the small-diameter particles. Therefore, when compared with a case in which particles having one average particle diameter are used, electrode coating may be performed with a relatively higher roll-pressing density, so that the energy density of an electrode may be increased.

Meanwhile, in the present invention, as a small-diameter particle, a lithium composite transition metal oxide having a nickel content of 80 atm % or greater is used. When a lithium composite transition metal oxide having a high nickel content is used as described above, high capacity properties may be implemented. However, a lithium composite transition metal oxide having a high nickel content of 80 atm % or greater is poor in structural stability, and thus, when a cycle is repeated or the oxide is exposed to a high-temperature, gas is generated or battery performance is rapidly deteriorated due to a side reaction with an electrolyte. Particularly, in the case of a small-diameter particle having a small average particle diameter ($D_{50}$), the above phenomenon tends to become more intense.

Therefore, in the present invention, as a small-diameter particle, a lithium composite transition metal oxide in the form of a single particle and containing a rock salt phase on a surface portion thereof is used.

When a rock salt phase is formed on a surface portion of the small-diameter particle, reactivity with an electrolyte is reduced, so that the occurrence of a side reaction caused by a reaction with the electrolyte is minimized, thereby improving particle surface stability. Meanwhile, the average thickness of the rock salt phase is 10-30 nm, preferably 10-20 nm. When the thickness of the rock salt phase is less than 10 nm, the effect of improving particle surface stability is insignificant, and when greater than 30 nm, resistance and/or capacity are deteriorated.

Meanwhile, the average thickness of the rock salt phase may be measured using a transmission electron microscope (TEM).

Meanwhile, the small-diameter particle used in the present invention is not in the form of aggregated secondary particles but in the form of a single particle, that is, a primary particle. In the present invention, a 'primary particle' means a primary structural body of a single particle, and a 'secondary particle' means an aggregate in which primary particles are aggregated by physical or chemical bonding between the primary particles without an intentional aggregation or assembly process for primary particles constituting a secondary particle, that is, a secondary structural body.

The lithium composite transition metal oxide in the form of a single particle described above has a higher particle strength than a lithium composite transition metal oxide in the form of a secondary particle, so that during roll-pressing, a phenomenon in which particles are broken may be reduced and the generation of a cycle crack may be suppressed.

In addition, the lithium composite transition metal oxide in the form of a single particle has a smaller specific surface area than a lithium composite transition metal oxide in the form of a secondary particle, thereby having a smaller area in contact with an electrolyte, so that the occurrence of a side reaction with the electrolyte may be minimized.

Meanwhile, the small-diameter particle may have an average particle diameter ($D_{50}$) of 2-8 μm, preferably 3-8 μm. As described above, the small-diameter particle is formed of a single particle (that is, a primary particle), so that the average particle diameter means the average particle diameter ($D_{50}$) of the primary particle of the small-diameter particle. When the average particle diameter ($D_{50}$) of the small-diameter particle satisfies the above range, the particle strength is increased to suppress particle breakage during roll-pressing, and the specific surface area is reduced to effectively suppress the occurrence of a side reaction with an electrolyte.

Specifically, the small-diameter particle may be a lithium composite transition metal oxide represented by [Formula 1] below.

$$Li_x[Ni_yCo_zM^1_wM^2_v]O_2 \quad\quad \text{[Formula 1]}$$

In Formula 1 above, $M^1$ is one or more selected from Mn and Al, $M^2$ is one or more selected from the group consisting of W, Cu, Fe, Ba, V, Cr, Ti, Zr, Zn, In, Ta, Y, La, Sr, Ga, Sc, Gd, Sm, Ca, Ce, Nb, Mg, B, and Mo, and 0.9≤x≤1.5, 0.8≤y<1, 0<z≤0.15, 0<w<0.2, and 0≤v≤0.2.

At this time, x represents the atomic fraction of lithium in the lithium composite transition metal oxide, and x may satisfy 0.9≤x≤1.5, preferably 0.9≤x≤1.2, and more preferably 0.9≤x≤1.1.

y represents the atomic fraction of nickel in all transition metals of the lithium composite transition metal oxide, and y may satisfy 0.8≤y<1, preferably 0.8≤y≤0.98, and more preferably 0.81≤y≤0.98.

z represents the atomic fraction of cobalt in all transition metals of the positive electrode active material, and z may satisfy 0<z≤0.15, preferably 0.01≤z≤0.15, and more preferably 0.01≤z≤0.1.

w represents the atomic fraction of an element M1 in all transition metals of the lithium composite transition metal oxide, and w may satisfy 0<w<0.2, preferably 0.01≤w≤0.15.

v represents the atomic fraction of an element M2 in all transition metals of the lithium composite transition metal oxide, and v may satisfy 0≤v≤0.2, preferably 0≤v≤0.15.

More preferably, the small-diameter particle may be a lithium composite transition metal oxide containing nickel, cobalt, manganese, and aluminum. For example, the small-diameter particle may be a lithium composite transition metal oxide represented by [Formula 2] below.

$$Li_x[Ni_yCo_zMn_{w1}Al_{w2}M^2_v]O_2 \quad\quad \text{[Formula 2]}$$

In Formula 2, M2 is one or more selected from the group consisting of W, Cu, Fe, Ba, V, Cr, Ti, Zr, Zn, In, Ta, Y, La, Sr, Ga, Sc, Gd, Sm, Ca, Ce, Nb, Mg, B, and Mo, and 0.9≤x≤1.5, 0.8≤y<1, 0<z≤0.15, 0<w1≤0.15, 0<w2≤0.15, 0≤v≤0.2, and 0<w1+w2<0.2.

At this time, x represents the atomic fraction of lithium in the lithium composite transition metal oxide, and x may satisfy 0.9≤x≤1.5, preferably 0.9≤x≤1.2, and more preferably 0.9≤x≤1.1.

y represents the atomic fraction of nickel in all transition metals of the lithium composite transition metal oxide, and y may satisfy 0.8≤y<1, preferably 0.8≤y≤0.98, and more preferably 0.81≤y≤0.98.

z represents the atomic fraction of cobalt in all transition metals of the positive electrode active material, and z may satisfy 0<z≤0.15, preferably 0.01≤z≤0.15, and more preferably 0.01≤z≤0.1.

w1 represents the atomic fraction of manganese in all transition metals of the lithium composite transition metal oxide, and w1 may satisfy 0<w1<0.15, preferably 0.01≤w1≤0.15.

w2 represents the atomic fraction of aluminum in all transition metals of the lithium composite transition metal oxide, and w2 may satisfy 0<w2<0.15, preferably 0.01≤w2≤0.15.

v represents the atomic fraction of a doping element M2 in all transition metals of the lithium composite transition metal oxide, and v may satisfy 0≤v≤0.2, preferably 0≤v≤0.15.

Meanwhile, the lithium composite transition metal oxide may further include, if necessary, a coating layer including at least one coating element selected from the group consisting of one or more elements selected from the group consisting of Al, Ti, W, B, F, P, Mg, Ni, Co, Fe, Cr, V, Cu, Ca, Zn, Zr, Nb, Mo, Sr, Sb, Bi, Si, and S. When the coating layer is included as described above, the contact between the lithium composite transition metal oxide and an electrolyte is blocked, thereby suppressing the occurrence of a side reaction. Therefore, when applied to a battery, lifespan properties may be improved, and also, the filling density of the positive electrode material may be increased.

When a coating element is further included as described above, the content of the coating element in the coating layer may be 100 ppm to 10,000 ppm, preferably 200 ppm to 5,000 ppm based on the total weight of the lithium composite transition metal oxide. For example, when a coating element is included in the above range based on the total weight of the lithium composite transition metal oxide, the occurrence of a side reaction with an electrolyte may be further effectively suppressed, and when applied to a battery, lifespan properties may be further improved.

The coating layer may be formed on the entire surface or on a portion of the surface of the lithium composite transition metal oxide. Specifically, when the coating layer is formed on a portion of the surface of the lithium composite transition metal oxide, the coating layer may be formed in an area of 5% to less than 100%, preferably 20% to less than 100% of the total surface area of the lithium composite transition metal oxide.

Next, the large-diameter particle is a positive electrode active material particle having a greater average particle diameter ($D_{50}$) than the small-diameter particle. For example, the large-diameter particle may be a lithium composite transition metal oxide particle in the form of a secondary particle.

The large-diameter particle may be a lithium composite transition metal oxide particle having an average particle diameter ($D_{50}$) of 10-20 μm, more preferably 10-17 μm. At this time, the average particle diameter ($D_{50}$) means the average particle diameter of a secondary particle.

Meanwhile, the large-diameter particle may be, for example, a lithium composite transition metal oxide having a nickel content of 80 atm % or greater in all transition metals. Specifically, the large-diameter particle may be a lithium composite transition metal oxide represented by either [Formula 1] or [Formula 2] described above. In the present invention, the large-diameter particle may have the same composition as that of the small-diameter particle, or may have a different composition.

The positive electrode material of the present invention may include the small-diameter particle and the large-diameter particle at a weight ratio of 1:9 to 5:5, preferably 2:8 to 3:7. When the mixing ratio of the small-diameter particle and the large-diameter particle satisfies the above range, roll-pressing density is improved so that energy density is increased, and due to the buffering action of the small-diameter particle, the large-diameter particle is prevented from being broken during roll-pressing an electrode so that it is advantageous in terms of lifespan properties.

<Method for Producing Positive Electrode Material>

Next, a method for producing a positive electrode material according to the present invention will be described.

The method for producing a positive electrode material according to the present invention includes 1) mixing a transition metal precursor having a nickel content of 80 atm % or greater in all transition metals of the transition metal precursor with a lithium raw material, and overfiring the mixture at a temperature of 800° C. to 850° C. to prepare a lithium composite transition metal oxide in the form of a single particle and containing rock salt phases having an average thickness of 10-30 nm formed on a surface thereof, and 2) mixing the lithium composite transition metal oxide in the form of a single particle with large-diameter particles having a greater average particle diameter ($D_{50}$) than the lithium composite transition metal oxide in the form of a single particle.

First, a transition metal precursor having a nickel content of 80 atm % or greater in all transition metals of the transition metal precursor and a lithium raw material are mixed.

The transition metal precursor may be a transition metal hydroxide or oxyhydroxide having a nickel content of 80 atm % or greater.

The transition metal precursor may be a commercially available positive electrode active material precursor purchased and used, or may be prepared according to a method for preparing a positive electrode active material precursor well known in the art.

For example, the transition metal precursor may be prepared by adding a metal solution containing a nickel-containing raw material, a cobalt-containing raw material, an M-containing raw material, and/or an $M^2$-containing raw material with an ammonium cation-containing complex formation agent and a basic compound, and subjecting the mixture to a co-precipitation reaction.

The nickel-containing raw material may be, for example, an acetate, a nitrate, a sulfate, a halide, a sulfide, a hydroxide, an oxide, or an oxyhydroxide, and the like, all containing nickel, specifically $Ni(OH)_2$, NiO, NiOOH, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, a nickel halide, or a combination thereof, but is not limited thereto.

The cobalt-containing raw material may be an acetate, a nitrate, a sulfate, a halide, a sulfide, a hydroxide, an oxide, or an oxyhydroxide, and the like, all containing cobalt, specifically $Co(OH)_2$, CoOOH, $Co(OCOCH_3)_2 \cdot 4H_2O$, $Co(NO_3)_2 \cdot 6H_2O$, $CoSO_4$, $CO(SO_4)_2 \cdot 7H_2O$, or a combination thereof, but is not limited thereto.

The M-containing raw material may be an acetate, a nitrate, a sulfate, a halide, a sulfide, a hydroxide, an oxide, or an oxyhydroxide, or a combination thereof, all containing $M^1$, specifically an acetate, a nitrate, a sulfate, a halide, a sulfide, a hydroxide, an oxide, or an oxyhydroxide, all containing manganese, and/or an acetate, a nitrate, a sulfate, a halide, a sulfide, a hydroxide, an oxide, or an oxyhydroxide, all containing aluminum. For example, the $M^1$-containing raw material may be a manganese oxide such as $Mn_2O_3$, $MnO_2$, and $Mn_3O_4$, a manganese salt such as $MnCO_3$, $Mn(NO_3)_2$, $MnSO_4$, a manganese acetate, a manganese dicarboxylate, a manganese citrate, and a manganese fatty acid, a manganese oxyhydroxide, a manganese chloride; $Al_2O_3$, $Al(OH)_3$, $AlSO_4$, $ALCl_3$, Al-isopropoxide, $AlNO_3$, AlF, or a combination thereof, but is not limited thereto.

The $M^2$-containing raw material may be an acetate, a nitrate, a sulfate, a halide, a sulfide, a hydroxide, an oxide, an oxyhydroxide, or a combination thereof, all containing $M^2$.

The transition metal solution may be prepared by adding the nickel-containing raw material, the cobalt-containing raw material, and the M-containing raw material to a solvent, specifically water, or a mixed solvent of water and an organic solvent which can be uniformly mixed with water (for example, alcohol, etc.). Alternatively, the transition metal solution may be prepared by mixing an aqueous solution of the nickel-containing raw material, an aqueous solution of the cobalt-containing raw material, and an aqueous solution of the M-containing raw material.

The ammonium cation-containing complex formation agent may be, for example, $NH_4OH$, $(NH_4)_2SO_4$, $NH_4NO_3$, $NH_4Cl$, $CH_3COONH_4$, $NH_4CO_3$, or a combination thereof, but is not limited thereto. Meanwhile, the ammonium cation-containing complex formation agent may be used in the form of an aqueous solution. At this time, water, or a mixture of an organic solvent which may be uniformly mixed with water (for example, alcohol, etc.) and water may be used as a solvent.

The basic compound may be a hydroxide of an alkali metal or alkaline earth metal such as NaOH, KOH or $Ca(OH)_2$, a hydrate thereof, or a combination thereof. The basic compound may also be used in the form of an aqueous solution. At this time, water, or a mixture of an organic solvent which may be uniformly mixed with water (for example, alcohol, etc.) and water may be used as a solvent.

The basic compound is added to control the pH of a reaction solution, and may be added in an amount such that the pH of the metal solution becomes 10.5 to 13, preferably 11 to 13.

Meanwhile, the co-precipitation reaction may be performed in an inert atmosphere, for example, in a nitrogen atmosphere or in an argon atmosphere, and the like, at a temperature of 40° C. to 70° C. In addition, in order to increase the reaction rate during the reaction, a stirring process may be selectively performed. At this time, the stirring rate may be 100 rpm to 2000 rpm.

Transition metal precursor particles are generated by the above process and precipitated in a reaction solution. The precipitated transition metal precursor particles are separated according to a typical method and dried to obtain a transition metal precursor.

Next, the transition metal precursor obtained by the method described above is mixed with a lithium raw material, and then the mixture is fired. The lithium raw material may be a carbonate (for example, lithium carbonate and the like), a hydrate (for example, lithium hydroxide hydrate ($LiOH \cdot H_2O$) and the like), a hydroxide (for example, lithium hydroxide and the like), a nitrate (for example, lithium nitrate ($LiNO_3$) and the like) and a chloride (for example, lithium chloride (LiCl) and the like), and the like, all containing lithium, and any one thereof or a mixture of two or more thereof may be used.

Meanwhile, the mixing of the transition metal precursor and the lithium raw material may be performed by solid state mixing such as jet milling.

Meanwhile, it is preferable that the transition metal precursor and the lithium raw material are mixed such that the molar ratio of lithium:transition metal is 1.05:1 to 1.1:1, preferably 1.06:1 to 1.09:1. When the mixing amount of the lithium raw material is greater than the above range, the amount of by-products may be increased during firing to have an adverse effect during the driving of a cell, such as the generation of gas. When less than the above range, capacity properties may be deteriorated, or the surface stability of active material particles may be deteriorated.

Meanwhile, when mixing the transition metal precursor with the lithium raw material, if necessary, the $M^1$ raw material and/or then $M^2$ raw material may be further mixed therewith.

For example, when producing a lithium composite transition metal oxide containing both Mn and Al as the $M^1$ element as in [Formula 2] above, a transition metal precursor containing Ni, Co, Mn, and Al may be used as the transition metal precursor. However, alternatively, a precursor containing Ni, Co, and Mn is used as the transition metal precursor, and an aluminum raw material may be further mixed when mixing with the lithium raw material. At this time, the aluminum raw material may be $Al_2O_3$, $Al(OH)_3$, $AlSO_4$, $AiCl_3$, $AlNO_3$, AlF, or a combination thereof, but is not limited thereto.

In this case, it is preferable that the aluminum raw material is mixed in an amount such that the atomic fraction of aluminum in the lithium composite transition metal oxide is 0 to 0.15, preferably 0.001 to 0.15, and more preferably 0.01 to 0.1.

Meanwhile, the firing may be performed at a temperature of 800° C. to 870° C. for 5 to 20 hours, preferably for 8 to 15 hours. When the heat treatment temperature and duration satisfy the above range, it is possible to obtain a lithium composite transition metal oxide in the form of a single particle and containing a rock salt phase having an average thickness of 10-30 nm formed on a surface portion thereof.

Next, the lithium composite transition metal oxide in the form of a single particle prepared as described above is mixed with large-diameter particles having a greater average particle diameter ($D_{50}$) than the lithium composite transition metal oxide in the form of a single particle to produce a positive electrode material.

<Positive Electrode and Secondary Battery>

The above-described positive electrode material according to the present invention may be usefully used in manufacturing a lithium secondary battery.

Specifically, a positive electrode according to the present invention includes the positive electrode material according to the present invention. More specifically, the positive electrode includes a positive electrode current collector and a positive electrode active material layer formed on the positive electrode current collector. At this time, the positive electrode active material layer may include the positive electrode material according to the present invention. The detailed description of the positive electrode material according to the present invention is the same as described above, and thus, a detailed description thereof will be omitted.

The positive electrode may be manufactured according to a typical method for manufacturing a positive electrode except that the positive electrode material according to the present invention is used as a positive electrode active material. For example, the positive electrode may be manufactured by preparing a positive electrode mixture material by dissolving or dispersing components constituting a positive electrode active material layer, which are a positive electrode material, a conductive material and/or a binder, in a solvent, applying the positive electrode mixture material on at least one surface of a positive electrode current collector, followed by drying and then roll-pressing. Alternatively, the positive electrode may be manufactured by casting the positive electrode mixture on a separate support, and then laminating a film obtained by being peeled off from the support on the positive electrode current collector.

At this time, the positive electrode current collector is not particularly limited as long as it has conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be formed on the surface of the positive electrode current collector to improve the adhesion of the positive electrode active material. For example, the positive electrode current collector may be used in various forms such as a film, a sheet, a foil, a net, a porous body, a foam, and a non-woven body.

On at least one surface of the current collector, a positive electrode active material layer including the positive electrode material according to the present invention, and further including, if necessary, at least one of a conductive material or a binder optionally is disposed.

The positive electrode material may be included in an amount of 80-99 wt %, more specifically 85-98 wt % based on the total weight of the positive electrode active material layer. When included in the above content range, excellent capacity properties may be exhibited.

The conductive material is used to impart conductivity to an electrode, and any conductive material may be used without particular limitation as long as it has electron conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used. The conductive material may be included in an amount of 1 wt % to 30 wt % based on the total weight of the positive electrode active material layer.

Also, the binder serves to improve the bonding between positive electrode active material particles and the adhesion between the positive electrode active material and the current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 1 wt % to 30 wt % based on the total weight of the positive electrode active material layer.

Meanwhile, the solvent used in preparing the positive electrode mixture material may be a solvent commonly used in the art. For example, dimethyl sulfoxide (DMSO), isopropyl alcohol, N-methylpyrrolidone (NMP), acetone, water, and the like may be used alone, or a mixture thereof may be used. The amount of the solvent to be used may be appropriately adjusted in consideration of the applying thickness, preparation yield, viscosity, and the like of a slurry.

Next, a secondary battery according to the present invention will be described.

The secondary battery according to the present invention includes a positive electrode, a negative electrode disposed to face the positive electrode, a separator interposed between the positive electrode and the negative electrode, and an electrolyte. At this time, the positive electrode is the positive electrode according to the present invention described above.

Meanwhile, the secondary battery may further include a battery case for accommodating an electrode assembly composed of the positive electrode, the negative electrode, and the separator, and a sealing member for sealing the battery case, optionally.

In the secondary battery, the negative electrode includes a negative electrode current collector and a negative electrode active material layer disposed on at least one surface of the negative electrode current collector.

The negative electrode may be manufactured according to a typical manufacturing method of a negative electrode known in the art. For example, the negative electrode may be manufactured by preparing a negative electrode mixture material by dissolving or dispersing components constituting a negative electrode active material layer, which are a negative electrode active material, a conductive material and/or a binder, in a solvent, applying the negative electrode mixture material on at least one surface of a negative electrode current collector, followed by drying and then roll-pressing.

The negative electrode current collector is not particularly limited as long as it has high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode collector may typically have a thickness of 3 µm to 500 µm, and as in the case of a positive electrode current collector, microscopic irregularities may be formed on the surface of the negative electrode current collector to improve the adhesion of the negative electrode active material. For example, the negative electrode current collector may be used in various forms such as a film, a sheet, a foil, a net, a porous body, a foam, and a non-woven body.

As the negative electrode active material, a compound capable of reversible intercalation and de-intercalation of lithium may be used. Specific examples thereof may include a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, a Si alloy, a Sn alloy, or an Al alloy; a metal oxide which may be doped and undoped with lithium such as $SiO_v$ (0<v<2), $SnO_2$, a vanadium oxide, and a lithium vanadium oxide; or a composite including the metallic compound and the carbonaceous material such as a Si—C composite or a Sn—C composite, and any one thereof or a mixture of two or more thereof may be used. Also, a metal lithium thin film may be used as the negative electrode active material. Furthermore, low crystalline carbon, high crystalline carbon and the like may all be used as a carbon material. Representative examples of the low crystalline carbon may include soft carbon and hard carbon, and representative examples of the high crystalline carbon may include irregular, planar, flaky, spherical, or fibrous natural graphite or artificial graphite, Kish graphite, pyrolytic carbon, mesophase pitch-based carbon fiber, meso-carbon microbeads, mesophase pitches, and high-temperature sintered carbon such as petroleum or coal tar pitch derived cokes.

Also, the binder and the conductive material may be the same as those described above in the description of the positive electrode.

Meanwhile, in the secondary battery, the separator is to separate the negative electrode and the positive electrode and to provide a movement path for lithium ions. Any separator may be used without particular limitation as long as it is typically used as a separator in a secondary battery. Particularly, a separator having high moisture-retention ability for an electrolyte as well as low resistance to the movement of electrolyte ions is preferable. Specifically, as the separator, a porous polymer film, for example, a porous polymer film prepared from a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point or polyethylene terephthalate fiber, and the like may be used. Furthermore, a coated separator including a ceramic component or a polymer material may be used to secure heat resistance or mechanical strength, and may be used in a single-layered or a multi-layered structure, selectively.

Meanwhile, the electrolyte may be an organic liquid electrolyte, an inorganic liquid electrolyte, a solid polymer electrolyte, a gel-type polymer electrolyte, a solid inorganic electrolyte, a molten-type inorganic electrolyte, and the like, which may be used in the manufacturing of a secondary battery, but is not limited thereto.

Specifically, the electrolyte may include an organic solvent and a lithium salt.

Any organic solvent may be used without particular limitation as long as it may serve as a medium through which ions involved in an electrochemical reaction of a battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used as the organic solvent. Among the above, a carbonate-based solvent is preferable, and a mixture of a cyclic carbonate (e.g., ethylene carbonate or propylene carbonate) having high ionic conductivity and high dielectric constant and a linear carbonate-based compound having low viscosity (e.g., ethylmethyl carbonate, dimethyl carbonate, or diethyl carbonate), the mixture which may increase charging/discharging performance of a battery, is more preferable.

Any lithium salt may be used as the lithium salt without particular limitation as long as it is typically used in an electrolyte for a lithium secondary battery. For example, $Li^+$ may be included as a positive ion of the lithium salt, and a negative ion thereof may be at least one selected from the group consisting of $F^-$, $Cl^-$, $Br^-$, $I^-$, $NO_3^-$, $N(CN)_2^-$, $BF_4^-$, $ClO_4^+$, $AlO_4^-$, $AlCl_4^-$, $PF_6^-$, $SbF_6^-$, $AsF_6^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$. Specifically, the lithium salt may include a single material selected from the group consisting of LiCl, LiBr, LiI, $LiClO_4$, $LiBF_4$, $LiB_{10}Cl_{10}$, $LiPF_6$, $LiCF_3SO_3$, $LiCH_3CO_2$, $LiCF_3CO_2$, $LiAsF_6$, $LiSbF_6$, $LiAlCl_4$, $LiAlO_4$, and $LiCH_3SO_3$, or a mixture of two or more thereof.

The content of the lithium salt may be appropriately changed within a typical range in which a lithium salt may be used. Specifically, the lithium salt may be included in an electrolyte in a range of 0.8 M to 3 M, specifically 1 M to 2.5 M.

In the electrolyte, in order to improve the lifespan properties of a battery, suppress the reduction in battery capacity, and improve the discharge capacity of the battery, and the like, various additives may be used in addition to the above electrolyte components. As the additives, for example, a halo-alkylene carbonate-based compound such as difluoroethylene carbonate; or pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may be included, and the above additives may be used alone or in combination. At this time, the additive may be included in an amount of 0.1 wt % to 5 wt % based on the total weight of the electrolyte.

The lithium secondary battery according to the present invention such as described above may be usefully used in portable devices such as a mobile phone, a notebook computer, and a digital camera, and in electric cars such as a hybrid electric vehicle (HEV).

Accordingly, according to another embodiment of the present invention, a battery module including the lithium secondary battery as a unit cell and a battery pack including the battery module are provided.

The battery module or the battery pack may be used as a power source of one or more medium-and-large-sized devices, for example, a power tool, an electric car such as an electric vehicle (EV), a hybrid electric vehicle (HEV), and a plug-in hybrid electric vehicle (PHEV), or a power storage system.

The external shape of the lithium secondary battery of the present invention is not particularly limited, but may be a cylindrical shape using a can, a square shape, a pouch shape, a coin shape, or the like.

The lithium secondary battery according to the present invention may be used in a battery cell which is used as a power source for a small-sized device, and may also be preferably used as a unit cell for a medium-and-large-sized battery module including a plurality of battery cells.

Hereinafter, examples of the present invention will be described in detail so that those skilled in the art can easily carry out the present invention. The present invention may, however, be embodied in many different forms and is not limited to the examples set forth herein.

Preparation Example 1

$[Ni_{0.83}Co_{0.08}Mn_{0.09}]O\cdot OH$ and a lithium raw material LiOH were mixed such that the molar ratio of Li:transition metal (Ni+Co+Mn) is 1.05:1, and then 8100 ppm of $Al_2O_3$ was introduced thereto to prepare a mixed powder. The mixed powder was placed in an alumina crucible, and then fired at 810° C. for 10 hours in an oxygen ($O_2$) atmosphere to form a lithium composite transition metal oxide $Li[Ni_{0.80}Co_{0.08}Mn_{0.09}Al_{0.03}]O_2$ having an average particle diameter $D_{50}$ of 6 μm.

The prepared lithium composite transition metal oxide was measured with a transmission electron microscope, and was confirmed to have rock salt phases having an average thickness of 20 nm formed on a surface portion thereof and have a single particle form.

Preparation Example 2

$[Ni_{0.83}Co_{0.08}Mn_{0.09}]O\cdot OH$ and a lithium raw material LiOH were mixed such that the molar ratio of Li:transition metal (Ni+Co+Mn) is 1.05:1, and then 8100 ppm of $Al_2O_3$ was introduced thereto to prepare a mixed powder. The mixed powder was placed in an alumina crucible, and then fired at 800° C. for 10 hours in an oxygen ($O_2$) atmosphere to form a lithium composite transition metal oxide Li[$Ni_{0.80}Co_{0.08}Mn_{0.09}Al_{0.03}$]$O_2$ having an average particle diameter $D_{50}$ of 5 μm.

The prepared lithium composite transition metal oxide was measured with a transmission electron microscope, and was confirmed to have rock salt phases having an average thickness of 10 nm formed on a surface portion thereof and have a single particle form.

Preparation Example 3

[$Ni_{0.83}Co_{0.08}Mn_{0.09}$]O·OH and a lithium raw material LiOH were mixed such that the molar ratio of Li:transition metal (Ni+Co+Mn) is 1.03:1, and then 5500 ppm of $Al_2O_3$ was introduced thereto to prepare a mixed powder. The mixed powder was placed in an alumina crucible, and then fired at 770° C. for 10 hours in an oxygen ($O_2$) atmosphere to form a lithium composite transition metal oxide Li[$Ni_{0.81}Co_{0.08}Mn_{0.09}Al_{0.02}$]$O_2$ having an average particle diameter $D_{50}$ of 6 μm.

The prepared lithium composite transition metal oxide was measured with a transmission electron microscope, and was confirmed to have rock salt phases having an average thickness of 8 nm formed on a surface portion thereof and have a secondary particle form.

Preparation Example 4

[$Ni_{0.83}Co_{0.08}Mn_{0.09}$]O·OH and a lithium raw material LiOH were mixed such that the molar ratio of Li:transition metal (Ni+Co+Mn) is 1.04:1, and then 5500 ppm of $Al_2O_3$ was introduced thereto to prepare a mixed powder. The mixed powder was placed in an alumina crucible, and then fired at 760° C. for 10 hours in an oxygen ($O_2$) atmosphere to form a lithium composite transition metal oxide Li[$Ni_{0.81}Co_{0.08}Mn_{0.09}Al_{0.02}$]$O_2$ having an average particle diameter $D_{50}$ of 6 μm.

The prepared lithium composite transition metal oxide was measured with a transmission electron microscope, and was confirmed to have no rock salt phase formed on a surface portion thereof and have a secondary particle form.

Preparation Example 5

[$Ni_{0.83}Co_{0.08}Mn_{0.09}$]O·OH and a lithium raw material LiOH were mixed such that the molar ratio of Li:transition metal (Ni+Co+Mn) is 1.077:1, and then 8100 ppm of $Al_2O_3$ was introduced thereto to prepare a mixed powder. The mixed powder was placed in an alumina crucible, and then fired at 800° C. for 10 hours in an oxygen ($O_2$) atmosphere to form a lithium composite transition metal oxide Li[$Ni_{0.80}Co_{0.08}Mn_{0.09}Al_{0.03}$]$O_2$ having an average particle diameter $D_{50}$ of 6 μm.

The prepared lithium composite transition metal oxide was measured with a transmission electron microscope, and was confirmed to have no rock salt phase formed on a surface portion thereof and have a single particle form.

Preparation Example 6

[$Ni_{0.83}Co_{0.08}Mn_{0.09}$]O·OH and a lithium raw material LiOH were mixed such that the molar ratio of Li:transition metal (Ni+Co+Mn) is 1.03:1, and then 8100 ppm of $Al_2O_3$ was introduced thereto to prepare a mixed powder. The mixed powder was placed in an alumina crucible, and then fired at 830° C. for 10 hours in an oxygen ($O_2$) atmosphere to form a lithium composite transition metal oxide Li[$Ni_{0.80}Co_{0.08}Mn_{0.09}Al_{0.03}$]$O_2$ having an average particle diameter $D_{50}$ of 6 μm.

The prepared lithium composite transition metal oxide was measured with a transmission electron microscope, and was confirmed to have rock salt phases having an average thickness of 32 nm formed on a surface portion thereof and have a single particle form.

Example 1

The lithium composite transition metal oxide in the form of a single particle and having an average particle diameter ($D_{50}$) of 6 μm prepared in Preparation Example 1 and a lithium composite transition metal oxide Li[$Ni_{0.83}Co_{0.11}Mn_{0.06}$]$O_2$(Manufacturer: LG Chemicals) in the form of a secondary particle and having an average particle diameter ($D_{50}$) of 11 μm were mixed at a weight ratio of 2:8 to produce a positive electrode material.

Example 2

A positive electrode material was produced in the same manner as in Example 1 except that the lithium composite transition metal oxide prepared in Preparation Example 2 was used instead of the lithium composite transition metal oxide prepared in Preparation Example 1.

Comparative Example 1

A positive electrode material was produced in the same manner as in Example 1 except that the lithium composite transition metal oxide prepared in Preparation Example 3 was used instead of the lithium composite transition metal oxide prepared in Preparation Example 1.

Comparative Example 2

A positive electrode material was produced in the same manner as in Example 1 except that the lithium composite transition metal oxide prepared in Preparation Example 4 was used alone.

Comparative Example 3

A positive electrode material was produced in the same manner as in Example 1 except that the lithium composite transition metal oxide prepared in Preparation Example 5 was used instead of the lithium composite transition metal oxide prepared in Preparation Example 1.

Comparative Example 4

A positive electrode material was produced in the same manner as in Example 1 except that the lithium composite transition metal oxide prepared in Preparation Example 6 was used instead of the lithium composite transition metal oxide prepared in Preparation Example 1.

<Manufacturing Coin Half-Cell>

The positive electrode material produced in each of Examples and Comparative Examples, a carbon black conductive material, and a PVdF binder were mixed in an N-methylpyrrolidone solvent at a weight ratio of 96.5:1.5:2.0 to prepare a positive electrode mixture material, and the mixture material was applied on one surface of an aluminum current collector, dried at 130° C., and then roll-pressed to manufacture a positive electrode.

Lithium metal was used as a negative electrode.

A porous polyethylene separator was interposed between the positive electrode and the negative electrode which were manufactured as described above to prepare an electrode assembly, and then the electrode assembly was placed inside a case. Thereafter, an electrolyte was injected into the case to manufacture a coin half-cell.

At this time, the electrolyte was prepared by dissolving lithium hexafluorophosphate ($LiPF_6$) of 1.0 M concentration in an organic solvent including ethylene carbonate/ethyl methyl carbonate/diethylene carbonate (mixing volume ratio of EC/EMC/DEC=3/4/3).

Experimental Example 1: Evaluation of Cycle Crack

Coin half-cells each manufactured by the above method and using the positive electrode material of each of Example 1 and Comparative Example 1 were charged and discharged with 0.33 C at 45° C. for 100 times each to perform 100 cycles of charge and discharge, and the generation of a cycle crack was confirmed with a transmission electron microscope. At this time, the charge was performed in a CC-CV (constant current-constant voltage) mode, and CV section charging was set to be terminated when a current having a current value of 0.005 C or less was to be applied. Meanwhile, the discharge was performed in a constant current (CC) mode.

Figure 1:
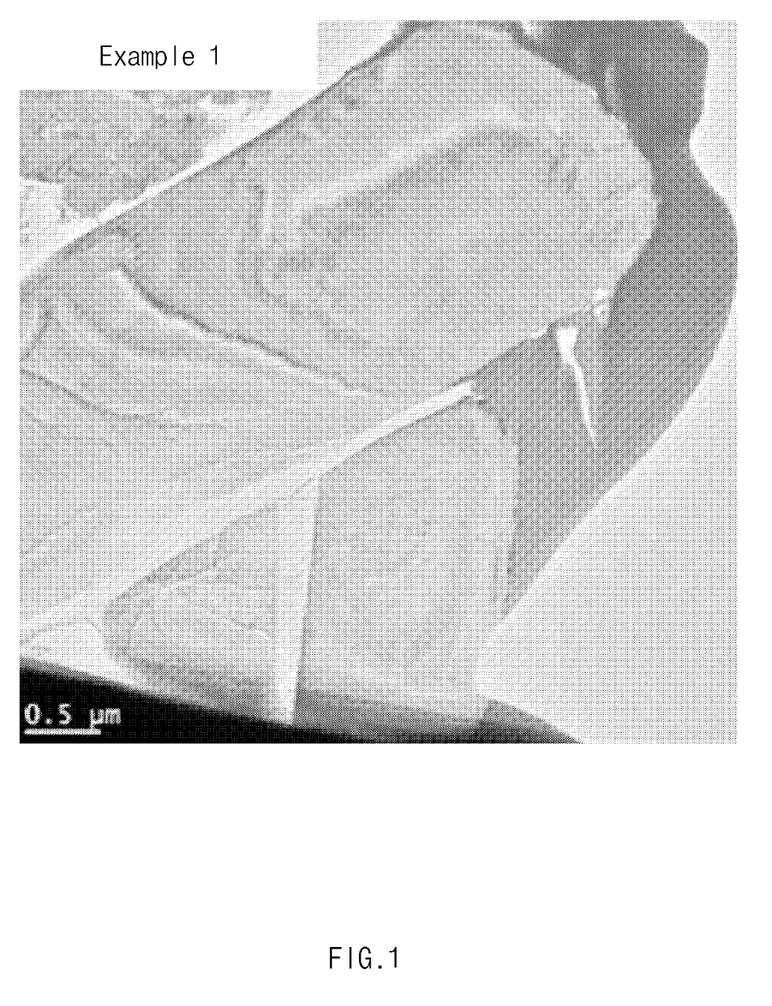
FIG. 1 is a transmission electron microscope (TEM) photograph of a small-diameter particle photographed after performing 100 cycles of charge and discharge on a lithium secondary battery applied with the positive electrode material of Example 1.
Figure 2:
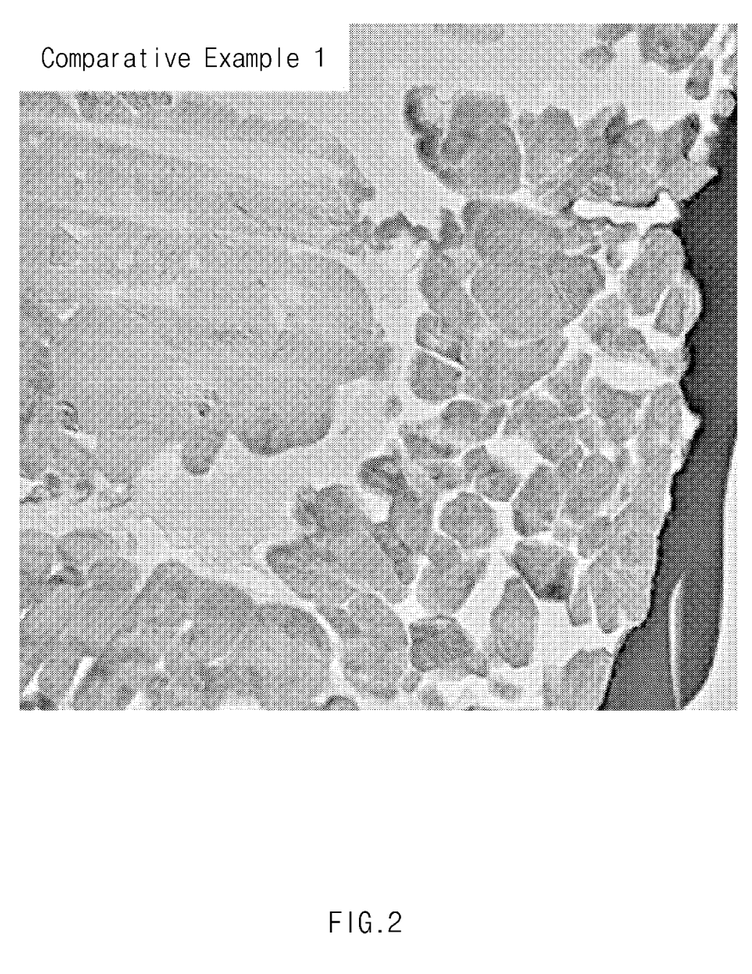
FIG. 2 is a transmission electron microscope (TEM) photograph of a small-diameter particle photographed after performing 100 cycles of charge and discharge on a lithium secondary battery applied with the positive electrode material of Comparative Example 1.

FIG. 1 illustrates a TEM photograph showing the state of small-diameter particles of the coin half-cell using the positive electrode material of Example 1 after the $100^{th}$ cycle, and FIG. 2 illustrates a TEM photograph showing the state of small-diameter particles of the coin half-cell using the positive electrode material of Comparative Example 1 after the $100^{th}$ cycle.

Through FIG. 1 and FIG. 2, it can be confirmed that Comparative Example 1 using small-diameter particles in the form of a secondary particle had cycle cracks between the small-diameter particles, but Example 1 using small-diameter particles in the form of a single particle had no cycle cracks.

Experimental Example 2: Evaluation of Continuous Charge

Coin half-cells each manufactured by the above method and using the positive electrode material of each of Examples 1 and 2 and Comparative Examples 1 to 4 were subjected to a leak current quantity measurement during continuous charge. Specifically, after a 0.2 C/0.2 C charge and discharge at 50° C., the coin half-cells were charged to 4.7 V with 0.2 C in a CC-CV mode and the charge was set to be terminated after 120 hours. The average leak current was obtained by dividing the capacity for 120 hours by an hour. The measurement results are shown in FIG. 3 below.

Figure 3:
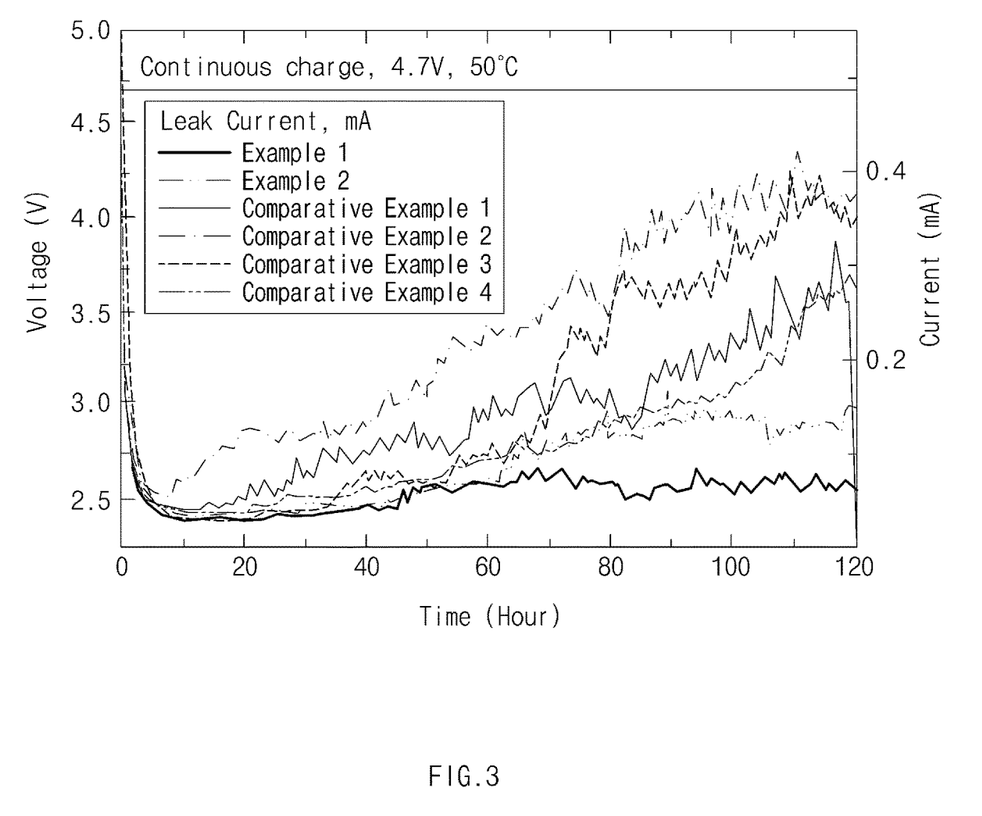
FIG. 3 is a graph showing the result of a leak current quantity evaluation during continuous charge evaluated according to Experimental Example 2.

As shown in FIG. 3, the coin half-cells each using the positive electrode material of each of Examples 1 and 2 had a smaller average leak current quantity than the coin half-cells each using the positive electrode material of each of Comparative Examples 1 to 4, and thus, were confirmed to have excellent continuous charge properties.

<Manufacturing Full-Cell>

The positive electrode material produced in each of Examples 1 and 2 and Comparative Examples 1 and 4, a carbon black conductive material, and a PVdF binder were mixed in an N-methylpyrrolidone solvent at a weight ratio of 96.5:1.5:2.0 to prepare a positive electrode mixture material, and the positive electrode mixture material was applied on one surface of an aluminum current collector, dried 130° C., and then roll-pressed to manufacture a positive electrode.

A negative electrode active material, a binder, and a conductive material were mixed in an N-methylpyrrolidone solvent at a weight ratio of 96.5:3.4:1.0 to prepare a negative electrode mixture material. At this time, natural graphite and artificial graphite were mixed at a weight ratio of 9:1 and used as a negative electrode active material, BML302 (Zeon Corporation) was used as a binder, and Super C-65 (Timcal Corporation) was used as a conductive material. The prepared negative electrode mixture material was applied on a copper current collector, dried at 130° C., and then roll-pressed to manufacture a negative electrode.

A separator was interposed between the positive electrode and the negative electrode manufactured as described, and then an electrolyte was injected thereto to manufacture a lithium secondary battery.

Experimental Example 3: High-Temperature Storage Properties

The lithium secondary battery manufactured as described above was subjected to a high-temperature storage properties evaluation according to the following method. The lithium secondary battery was fully charged to 4.2 V and stored at 60° C. for 8 weeks. At the end of each week, the coin cell was charged to 4.2 V with a constant current of 0.33 C and then discharged to 2.5 V with a constant current of 0.33 C, and the discharge capacity and the resistance thereof at that time were measured. Thereafter, the measured discharge capacity and the measured resistance were compared with the initial discharge capacity and the initial resistance to measure a capacity retention rate and a resistance increase rate. The measurement results are shown in FIG. 4 below.

Figure 4:
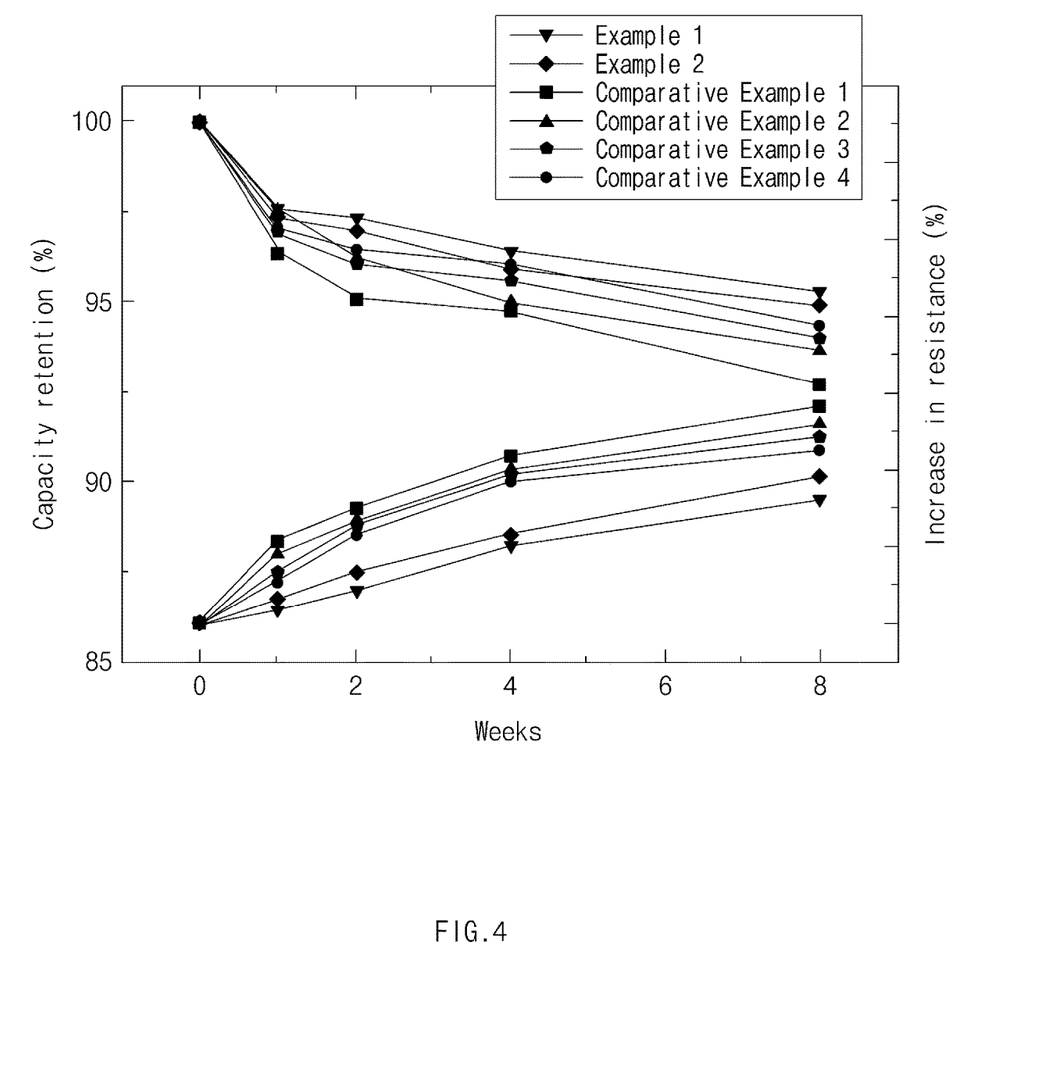
FIG. 4 is a graph showing high-temperature storage properties evaluated according to Experimental Example 3.

Through FIG. 4, it can be confirmed that the lithium secondary battery using the positive electrode material of each of Examples 1 and 2 had a higher capacity retention rate and a lower resistance increase rate after the high-temperature storage than the lithium secondary battery using the positive electrode material of each of Comparative Examples 1 to 4.

Experimental Example 4: High-Temperature Lifespan Properties

The lithium secondary battery manufactured as described above was subjected to a lifespan properties evaluation according to the following method.

Figure 5:
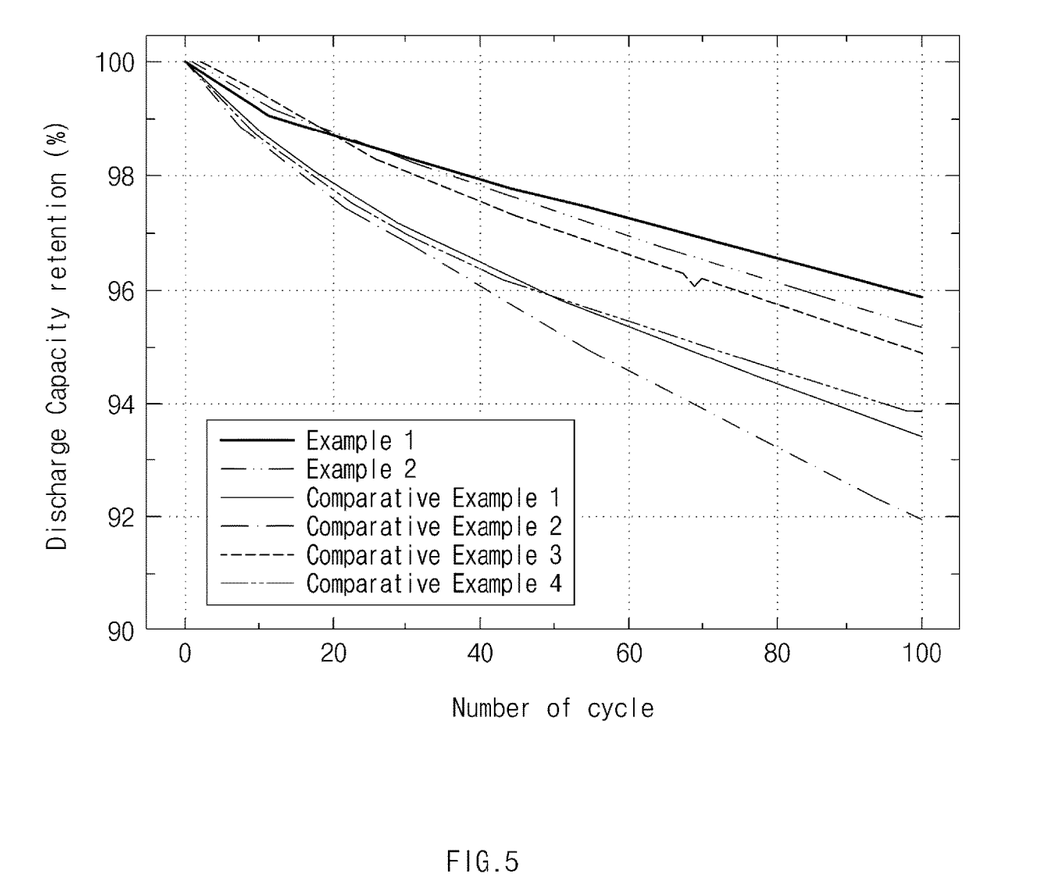
FIG. 5 is a graph showing high-temperature storage properties evaluated according to Experimental Example 4.

The lithium secondary battery was charged to 4.2 V with 0.33 C at 45° C. and discharged to 2.5 V with a constant current of 0.33 C for 100 times each to perform 100 cycles of charge and discharge, and a discharge capacity retention rate after the $100^{th}$ cycle was measured. The measurement results are shown in FIG. 5 below. As shown in FIG. 5, the lithium secondary battery using the positive electrode material of each of Examples 1 and 2 had a discharge capacity retention rate after the $100^{th}$ cycle of 95% or greater. In comparison, the lithium secondary battery using the positive electrode material of each of Comparative Examples 1 to 4 had a discharge capacity retention rate after the $100^{th}$ cycle of less than 95%.

The invention claimed is:

1. A positive electrode material, comprising:
a bimodal particle size distribution including a large-diameter particle and a small-diameter particle, wherein the large-diameter particle has a greater average particle diameter ($D_{50}$) than the small-diameter particle, wherein
the small-diameter particle is a lithium composite transition metal oxide in the form of a single particle and having a nickel content of 80 atm % or greater in all transition metals of the lithium composite transition metal oxide, and containing rock salt phases having an average thickness of 10-30 nm on a surface portion thereof, and
wherein the single particle is a primary particle.

2. The positive electrode material of claim 1, wherein the small-diameter particle is a lithium composite transition metal oxide represented by Formula 1 below:

$$Li_x[Ni_yCo_zM^1_wM^2_v]O_2 \qquad \text{[Formula 1]}$$

in Formula 1, $M^1$ is one or more selected from Mn and Al, $M^2$ is one or more selected from the group consisting of W, Cu, Fe, Ba, V, Cr, Ti, Zr, Zn, In, Ta, Y, La, Sr, Ga, Sc, Gd, Sm, Ca, Ce, Nb, Mg, B, and Mo, and $0.9 \leq x \leq 1.5$, $0.8 \leq y < 1$, $0 < z \leq 0.15$, $0 < w < 0.2$, and $0 \leq v \leq 0.2$.

3. The positive electrode material of claim 2, wherein the small-diameter particle is a lithium composite transition metal oxide represented by Formula 2 below:

$$Li_x[Ni_yCo_zMn_{w1}Al_{w2}M^2_v]O_2 \qquad \text{[Formula 2]}$$

in Formula 2, $M^2$ is one or more selected from the group consisting of W, Cu, Fe, Ba, V, Cr, Ti, Zr, Zn, In, Ta, Y, La, Sr, Ga, Sc, Gd, Sm, Ca, Ce, Nb, Mg, B, and Mo, and $0.9 \leq x \leq 1.5$, $0.8 \leq y < 1$, $0 < z \leq 0.15$, $0 < w1 \leq 0.15$, $0 < w2 \leq 0.15$, $0 \leq v \leq 0.2$, and $0 < w1+w2 < 0.2$.

4. The positive electrode material of claim 1, wherein the large-diameter particle is a lithium composite transition metal oxide in a form of a secondary particle.

5. The positive electrode material of claim 1, wherein the large-diameter particle is a lithium composite transition metal oxide having a nickel content of 80 atm % or greater in all transition metals.

6. The positive electrode material of claim 5, wherein the large-diameter particle is a lithium composite transition metal oxide represented by Formula 1 below:

$$Li_x[Ni_yCo_zM^1_wM^2_v]O_2 \qquad \text{[Formula 1]}$$

in Formula 1, $M^1$ is one or more selected from Mn and Al, $M^2$ is one or more selected from the group consisting of W, Cu, Fe, Ba, V, Cr, Ti, Zr, Zn, In, Ta, Y, La, Sr, Ga, Sc, Gd, Sm, Ca, Ce, Nb, Mg, B, and Mo, and $0.9 \leq x \leq 1.5$, $0.8 \leq y < 1$, $0 < z \leq 0.15$, $0 < w < 0.2$, and $0 \leq v \leq 0.2$.

7. The positive electrode material of claim 1, wherein the average particle diameter ($D_{50}$) of the small-diameter particles is 2 to 8 μm.

8. The positive electrode material of claim 1, wherein the average particle diameter ($D_{50}$) of the large-diameter particles is 10 to 20 μm.

9. The positive electrode material of claim 1, wherein the small-diameter particle and the large-diameter particle are included in a weight ratio of 1:9 to 5:5.

10. A method for producing a positive electrode material, comprising:
mixing a transition metal precursor having a nickel content of 80 atm % or greater in all transition metals of the transition metal precursor with a lithium raw material to obtain a mixture,
overfiring the mixture at a temperature of 800° C. to 850° C. to prepare a small-diameter particle that is lithium composite transition metal oxide in a form of a single particle and containing rock salt phases having an average thickness of 10-30 nm formed on a surface thereof, wherein the single particle is a primary particle; and
mixing the small-diameter particle with a large-diameter particle having a greater average particle diameter ($D_{50}$) than the small-diameter particle to prepare a positive electrode material having a bimodal particle size distribution.

11. The method of claim 10, wherein the transition metal precursor and the lithium raw material are mixed wherein a molar ratio of lithium:transition metal is 1.05:1 to 1.1:1.

12. A positive electrode comprising the positive electrode material of claim 1.

13. A lithium secondary battery comprising the positive electrode of claim 12.

* * * * *